(12) United States Patent
Jiang

(10) Patent No.: US 12,470,817 B2
(45) Date of Patent: Nov. 11, 2025

(54) SHOOTING METHOD AND APPARATUS, AND ELECTRONIC DEVICE

(71) Applicant: VIVO MOBILE COMMUNICATION CO., LTD., Dongguan (CN)

(72) Inventor: Chongkui Jiang, Zhejiang (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 305 days.

(21) Appl. No.: 18/131,069

(22) Filed: Apr. 5, 2023

(65) Prior Publication Data

US 2023/0247287 A1   Aug. 3, 2023

Related U.S. Application Data

(63) Continuation of application No. PCT/CN2021/122635, filed on Oct. 8, 2021.

(30) Foreign Application Priority Data

Oct. 14, 2020   (CN) .......................... 202011099089.3

(51) Int. Cl.
*H04N 23/667* (2023.01)
*H04N 5/77* (2006.01)
*H04N 23/63* (2023.01)
*H04N 23/65* (2023.01)

(52) U.S. Cl.
CPC ........... *H04N 23/667* (2023.01); *H04N 5/772* (2013.01); *H04N 23/63* (2023.01); *H04N 23/651* (2023.01)

(58) Field of Classification Search
None
See application file for complete search history.

(56) References Cited

U.S. PATENT DOCUMENTS

| | | |
|---|---|---|
| 2018/0255211 A1 | 9/2018 | Kniffen et al. |
| 2019/0199926 A1 | 6/2019 | An et al. |
| 2019/0260914 A1 | 8/2019 | Kim et al. |
| 2020/0128181 A1 | 4/2020 | An |
| 2023/0055623 A1 | 2/2023 | Wei |

FOREIGN PATENT DOCUMENTS

| | | |
|---|---|---|
| CN | 102695042 A | 9/2012 |
| CN | 104967803 A | 10/2015 |
| CN | 105847680 A | 8/2016 |
| CN | 107395972 A | 11/2017 |
| CN | 108259738 A | 7/2018 |
| CN | 108462842 A | 8/2018 |
| CN | 111526314 A | 8/2020 |
| CN | 111601040 A | 8/2020 |
| CN | 112333382 A | 2/2021 |

*Primary Examiner* — Mark T Monk
(74) *Attorney, Agent, or Firm* — The Webb Law Firm

(57) ABSTRACT

A shooting method includes: when a target shooting object has entered a shooting range of a first camera but has not entered a shooting range of a second camera, starting a target shooting function of the second camera; and when the target shooting object has entered the shooting range of the second camera, obtaining an image of the target shooting object captured by the second camera using the target shooting function; where the shooting range of the first camera is larger than the shooting range of the second camera, and the shooting range of the first camera includes the shooting range of the second camera; and the target shooting function includes a continuous-shooting function or a function of recording at a first recording frame rate.

13 Claims, 4 Drawing Sheets

When a target shooting object has entered a shooting range of a first camera but has not entered a shooting range of a second camera, a shooting apparatus starts a target shooting function of the second camera  —— 201

When the target shooting object has entered the shooting range of the second camera, the shooting apparatus obtains an image of the target shooting object captured by the second camera using the target shooting function —— 202

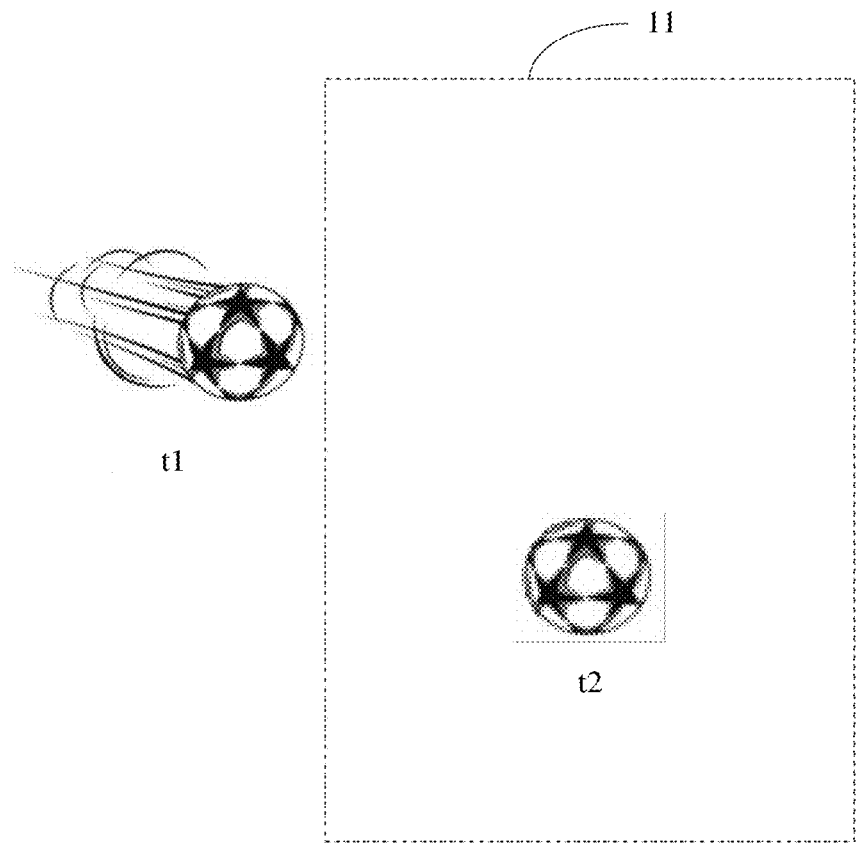

FIG. 1

```
When a target shooting object has entered a shooting range of a first
camera but has not entered a shooting range of a second camera, a          201
shooting apparatus starts a target shooting function of the second camera
```

```
When the target shooting object has entered the shooting range of the
second camera, the shooting apparatus obtains an image of the target       202
shooting object captured by the second camera using the target shooting
function
```

FIG. 2

SHOOTING METHOD AND APPARATUS, AND ELECTRONIC DEVICE

CROSS-REFERENCE TO RELATED APPLICATIONS

This application is a Bypass Continuation Application of PCT/CN2021/122635, filed on Oct. 8, 2021, and claims priority to Chinese Patent Application No. 202011099089.3, filed on Oct. 14, 2020, the disclosures of which are hereby incorporated by reference in their entireties.

BACKGROUND OF THE INVENTION

Field of the Invention

Embodiments of this application relate to the field of communication technologies, and in particular, to a shooting method and apparatus, and an electronic device.

Description of Related Art

With improvement of the shooting function of electronic devices, users use electronic devices to shoot a variety of photos and videos, and this has become an important way for people to record good times in their life.

SUMMARY OF THE INVENTION

Embodiments of this application provide a shooting method and apparatus, and an electronic device.

According to a first aspect, an embodiment of this application provides a shooting method. The method includes: when a target shooting object has entered a shooting range of a first camera but has not entered a shooting range of a second camera, starting a target shooting function of the second camera; and when the target shooting object has entered the shooting range of the second camera, obtaining an image of the target shooting object captured by the second camera using the target shooting function; where the shooting range of the first camera is larger than the shooting range of the second camera, and the shooting range of the first camera includes the shooting range of the second camera; and the target shooting function includes a continuous-shooting function or a function of recording at a first recording frame rate.

According to a second aspect, an embodiment of this application further provides a shooting apparatus. The apparatus includes an execution module and an obtaining module, where the execution module is configured to: when a target shooting object has entered a shooting range of a first camera but has not entered a shooting range of a second camera, start a target shooting function of the second camera; and the obtaining module is configured to: when the target shooting object has entered the shooting range of the second camera, obtain an image of the target shooting object captured by the second camera using the target shooting function started by the execution module; where the shooting range of the first camera is larger than the shooting range of the second camera, and the shooting range of the first camera includes the shooting range of the second camera; and the target shooting function includes a continuous-shooting function or a function of recording at a first recording frame rate.

According to a third aspect, an embodiment of this application provides an electronic device including a processor, a memory, and a program or instructions stored in the memory and executable on the processor, where when the program or instructions are executed by the processor, the steps of the shooting method according to the first aspect are implemented.

According to a fourth aspect, an embodiment of this application provides a non-transitory readable storage medium, where the non-transitory readable storage medium stores a program or instructions, and when the program or instructions are executed by a processor, the steps of the method according to the first aspect are implemented.

According to a fifth aspect, an embodiment of this application provides a chip, where the chip includes a processor and a communication interface, the communication interface is coupled to the processor, and the processor is configured to run a program or instructions so as to implement the method according to the first aspect.

BRIEF DESCRIPTION OF DRAWINGS

FIG. 1 is a schematic diagram of application of a shooting method in the related art according to an embodiment of this application;

FIG. 2 is a schematic flowchart of a shooting method according to an embodiment of this application;

DESCRIPTION OF THE INVENTION

Figure 3:
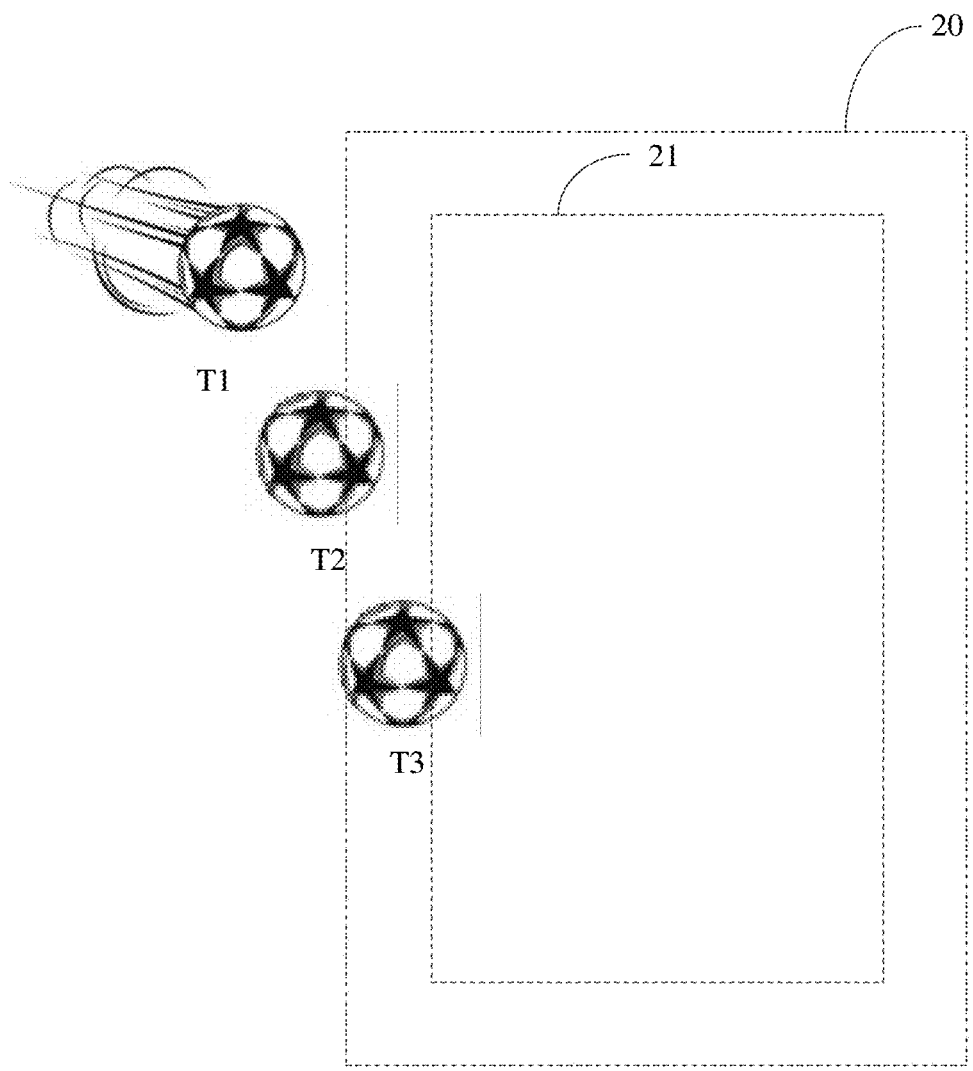
FIG. 3 is a schematic diagram of application of a shooting method according to an embodiment of this application.

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application within the protection scope of this application.

The terms "first", "second", and the like in this specification and claims of this application are used to distinguish between similar objects rather than to describe a specific order or sequence. It should be understood that data used in this way is used interchangeably in appropriate circumstances so that the embodiments of this application can be implemented in other orders than the order illustrated or described herein. In addition, "first", "second", and the like are usually used to distinguish objects of a same type, and do not restrict a quantity of objects. For example, there may be one or a plurality of first objects. In addition, "and/or" in the specification and claims represents at least one of connected objects, and the character "/" generally indicates that the associated objects have an "or" relationship.

In the related art, users can use a slow-motion function of an electronic device to capture a rapidly changing motion, and can also use a continuous-shooting function to take continuous shots of an object, for example, a process of a balloon bursting and a process of a ball bouncing after hitting the ground. Generally, when the user selects a shooting mode corresponding to the above functions and presses the shooting button, the electronic device directly adjusts camera parameters to shooting parameters corresponding to the shooting mode selected by the user. For example, when the user switches the shooting mode to slow-motion shooting mode, the electronic device sets the recording frame rate of the camera to high frame rate, and the camera uses the high-frame-rate recording mode for shooting after the user presses the shooting button.

The shooting method provided in the embodiments of this application may be applied to scenarios where users use an electronic device for shooting.

For example, for the scenarios where users use the electronic device for shooting, in the related art, when the user selects a corresponding shooting mode and presses the shooting button, the electronic device directly adjusts camera parameters to shooting parameters corresponding to the shooting mode selected by the user. For example, when the user shoots a slow-motion video, the electronic device generally uses a fixed high-frame-rate recording mode for shooting, that is, as long as the electronic device starts the slow-motion video shooting function, the recording frame rate of the camera is set to high frame rate. However, in a case that a shot object has not entered the shooting range, the camera is also in the high-frame-rate recording mode, resulting in that the camera stays long in a high-power-consumption mode and the generated shot files are large due to a large number of unnecessary frames (image frames without the shot object).

Regarding these problems, in the related art, persons skilled in the art usually come up with dynamically adjusting the recording frame rate of the camera by detecting whether the shot object is in the shooting range of the camera, so as to resolve the above problems. However, normally, when the electronic device is shooting in the slow-motion mode, the shot object moves fast. Therefore, if the recording frame rate of the camera is adjusted according to the above method, it is possible that the recording frame rate of the camera is adjusted to high frame rate only when the shot object has been in the shooting range for some time or is about to leave the shooting range, leading to poor shooting effect. As shown in FIG. 1, area 11 is a shooting range of a camera, a fast-moving football has not entered a shooting preview range of the camera at time t1, and the camera may be in a low-frame-rate recording mode. Due to the fast speed of the football, it is possible that the electronic device only detects the football's entrance into the shooting range of the camera and sets the recording frame rate of the camera to high frame rate at time t2. In this case, the electronic device only shoots the football in a slow-motion mode after time t2 and only shoots the football in a normal mode before time t2, thus leading to poor shooting effect.

Therefore, the embodiments of this application provide a shooting method to resolve all of the possible problems mentioned above. According to the technical solutions provided in the embodiments of this application, images captured by two cameras with different shooting ranges are detected. When it is detected that no target shooting object has entered a shooting range of a first camera with a larger shooting range, a second camera with a smaller shooting range is in a working mode of a second recording frame rate (low-frame-rate mode), and when it is detected that a target shooting object has entered the shooting range of the first camera but has not entered the shooting range of the second camera, a recording frame rate of the second camera is updated from the second recording frame rate to a first recording frame rate (high-frame-rate mode) or a continuous-shooting function is started, so that the second camera works in the low-frame-rate recording mode before the target shooting object enters the shooting range of the second camera, and when the target shooting object has entered the shooting range of the second camera, the second camera can shoot the target shooting object in a high-frame-rate recording mode or take continuous shots of the target shooting object. This reduces power consumption of the second camera before slow-motion shooting or continuous shooting of the target shooting object and reduces the file size of generated shot files.

The following describes in detail a shooting method provided in the embodiments of this application by using some embodiments and application scenarios thereof with reference to the accompanying drawings.

As shown in FIG. 2, an embodiment of this application provides a shooting method. The method may include the following step 201 and step 202.

Step 201. When a target shooting object has entered a shooting range of a first camera but has not entered a shooting range of a second camera, a shooting apparatus starts a target shooting function of the second camera.

For example, the first camera may be a camera having a dynamic vision sensor (DVS), mainly used for detecting for a moving object; and the second camera may be a camera that can dynamically adjust a recording frame rate, mainly used for shooting slow-motion videos or continuous photos. It should be noted that a working mechanism of the dynamic vision sensor is as follows: an address-event representation based dynamic vision sensor mimics biological vision. The conventional visual image acquisition method is based on "frames" acquired at a fixed frequency, with defects of high redundancy, high latency, high noise, low dynamic range, high data volume, and the like. To be specific, a conventional RGB camera needs to acquire an image frame first, and then perform image recognition on the image frame, so as to determine whether an object has entered a shooting range of the camera, with slow recognition speed. The dynamic vision sensor works asynchronously with pixels, and only outputs address and information of pixels with changes in light intensity, rather than passively reading information of each pixel in a "frame" in turn, thereby eliminating redundant data from the source, and featuring real-time dynamic response to scenario changes, ultra-sparse representation of images, and asynchronous output of events. Therefore, compared with the RGB camera, the DVS camera has not only a wide shooting range but also a fast response speed, able to identify an object that enters the shooting range of the DVS camera before the object enters the shooting range of the second camera, so that the electronic device can start a high-frame-rate recording mode or continuous-shooting mode of the second camera in a timely manner.

Step 202. When the target shooting object has entered the shooting range of the second camera, the shooting apparatus obtains an image of the target shooting object captured by the second camera using the target shooting function.

For example, after starting the corresponding shooting function, the electronic device obtains an image of the target shooting object captured by the second camera using this shooting function. The image may be a slow-motion video or continuously-shot pictures. In some embodiments, when the target shooting function is a continuous-shooting function, the electronic device obtains continuously-shot images of the target shooting object captured by the second camera; and when the target shooting function is a slow-motion shooting function, the electronic device obtains multiple slow-motion video frames of the target shooting object captured by the second camera and generates a slow-motion video.

The shooting range of the first camera is larger than the shooting range of the second camera, and the shooting range of the first camera includes the shooting range of the second camera. The target shooting function includes a continuous-shooting function or a function of recording at a first recording frame rate.

For example, in this embodiment of this application, the electronic device is equipped with two cameras with different shooting ranges, and the shooting range of the first camera is larger than the shooting range of the second camera. The moving target shooting object enters the shooting range of the first camera first and triggers a corresponding function of the second camera, and then the target shooting object enters the shooting range of the second camera, so that the electronic device has enough time to adjust a working mode of the second camera, avoiding the problem in FIG. 1, and thus obtaining shooting content with better shooting effect.

In some embodiments of this application, the electronic device is provided with two cameras with different shooting ranges, and when the target shooting object has entered the shooting range of the first camera but has not entered the shooting range of the second camera, the electronic device is triggered to adjust the working mode of the second camera. The following two working modes may be included.

Working Mode 1:

Optionally, in this embodiment of this application, working mode 1 is a high-frame-rate recording mode.

For example, before the target shooting object enters the shooting range of the first camera, a recording frame rate of the second camera is a second recording frame rate. That is, when the target shooting object has not entered the shooting range of the first camera, the second camera is in a low-frame-rate recording mode.

For example, step 201 may include the following step 202*a*.

Step 202*a*. When the target shooting object has entered the shooting range of the first camera but has not entered the shooting range of the second camera, update the recording frame rate of the second camera from the second recording frame rate to the first recording frame rate.

The second recording frame rate is less than the first recording frame rate.

For example, when the target shooting object has entered the shooting range of the first camera but has not entered the shooting range of the second camera, the electronic device sets the recording frame rate of the second camera from low frame rate to high frame rate.

For example, FIG. 3 shows the shooting ranges of the two cameras of the electronic device, where a shooting range 20 of camera 1 (that is, the first camera) is larger than a shooting range 21 of camera 2 (that is, the second camera). When a football (that is, the target shooting object) has not entered the shooting range 20 (that is, at time T1), camera 2 works in a low-frame-rate recording mode; and when the football has entered the shooting range 20 but has not entered the shooting range 21 (that is, at time T2), the electronic device updates the recording frame rate of camera 2 from low frame rate to high frame rate, so that when the football enters the shooting range 21 (that is, at time T3), the electronic device can shoot the football in a slow-motion mode via camera 2.

In this way, the electronic device can set the second camera to the high-frame-rate recording mode when the target shooting object has entered the shooting range of the first camera, so that when the target shooting object has entered the shooting range of the second camera, the second camera can shoot a complete slow-motion video of the target shooting object.

Working Mode 2:

Optionally, in this embodiment of this application, working mode 2 is a continuous-shooting mode.

For example, when the target shooting object has not entered the shooting range of the second camera, the second camera is in a work state of not shooting, and a user can only observe a shooting preview screen captured by the second camera. To be specific, when the electronic device adjusts the working mode of the second camera to the continuous-shooting mode and the user presses the shooting button, the first camera is in a real-time detection state, and the second camera is in the continuous-shooting mode but in the state of not shooting.

For example, when the target shooting object has entered the shooting range of the first camera but has not entered the shooting range of the second camera, the electronic device controls the second camera to take continuous shots.

In this way, when it is detected that the target shooting object has entered the shooting range of the first camera but has not entered the shooting range of the second camera, the recording frame rate of the second camera is updated to the first recording frame rate (high-frame-rate mode) or the continuous-shooting function is started, so that the second camera works in the low-frame-rate recording mode before the target shooting object enters the shooting range of the second camera, and when the target shooting object has entered the shooting range of the second camera, the second camera can shoot the target shooting object in the high-frame-rate recording mode or take continuous shots of the target shooting object. This reduces power consumption of the second camera before slow-motion shooting or continuous shooting of the target shooting object and reduces file size of generated shot files.

Optionally, in this embodiment of this application, in a case that the second camera is shooting a slow-motion video, to minimize the power consumption of the second camera and the size of shot files, the electronic device can reduce the recording frame rate of the second camera when the target shooting object leaves the shooting range of the camera.

For example, after step 202, the shooting method provided in this embodiment of this application may further include the following step 202*b*.

Step 202*b*. When the target shooting object leaves the shooting range of the first camera or the shooting range of the second camera, the shooting apparatus updates the recording frame rate of the second camera from the first recording frame rate to the second recording frame rate.

For example, the electronic device may set the target shooting object leaving the shooting range of the second camera as a trigger condition for updating the recording frame rate of the second camera from the first recording frame rate to the second recording frame rate, or may set the target shooting object leaving the shooting range of the first camera as the trigger condition for updating the recording frame rate of the second camera from the first recording frame rate to the second recording frame rate.

For example, when there are multiple target shooting objects, and among the multiple target shooting objects, only part of the target shooting objects leave the shooting range of the first camera or the second camera, the electronic device does not perform the above operation. When all the multiple target shooting objects leave the shooting range of the first camera or the second camera, the electronic device updates the recording frame rate of the second camera from the first recording frame rate to the second recording frame rate.

It should be noted that, in a case that the first camera is a DVS camera, because the DVS camera only outputs address and information of pixels with changes in light intensity, rather than passively reading information of each pixel in a "frame" in turn, the electronic device can only obtain position coordinate points of a shot object at each time point within the shooting range of the DVS camera, where multiple coordinate points at multiple time points form a motion track of the shot object. Therefore, for a same shot object, its motion track is generally a curve that conforms to a specified change rule. The electronic device can determine, according to a trend of the curve, a movement direction of the shot object, whether the shot object has left the shooting range of the DVS camera, and other information. For different shot objects, when the multiple different shot objects are all within the shooting range of the DVS camera, different shot objects have different motion curves. In this embodiment of this application, the electronic device can determine whether to adjust parameters of the second camera simply by identifying whether the shooting range of the second camera includes a shot object without distinguishing whether the identified shot objects are the same one.

In this way, the electronic device can adjust the working mode of the camera when the target shooting object leaves the shooting range of the camera, so as to minimize the power consumption of the second camera and the size of shot files.

Optionally, in this embodiment of this application, the electronic device only detects for the shot object in a foreground area of the camera but not for the shot object in a background area of the camera, so as to prevent the electronic device from incorrectly adjusting the working mode of the second camera.

For example, before step 201, the shooting method provided in this embodiment of this application may further include the following step 201*a*.

Step 201*a*. The shooting apparatus detects a shooting preview screen of the first camera.

The shooting preview screen includes a foreground area and a background area. The target shooting object is a shot object entering the foreground area at a speed exceeding a preset speed. The preset speed is greater than a movement speed of any object in the background area.

For example, the foreground area is an area in which clear shots can be taken by the second camera at a current focal length. Correspondingly, the background area is an area in the shooting preview screen other than the foreground area. The above areas are areas in three-dimensional space.

For example, generally, a shot object of slow-motion shooting is an object moving at a high speed. Therefore, when the electronic device detects presence of an object entering the foreground area at a speed exceeding the preset speed, the electronic device can be triggered to update the recording frame rate of the second camera from the second recording frame rate to the first recording frame rate.

In this way, when an object entering the shooting range satisfies a specified condition, the electronic device can be triggered to adjust the recording frame rate of the second camera, so as to reduce false triggering.

Optionally, in this embodiment of this application, to prevent a large number of blank photos from being generated when the user uses the electronic device for continuous shooting, the electronic device can automatically stop the continuous-shooting function of the second camera after the target shooting object leaves the shooting range of the first camera.

For example, since the first camera has a motion detection function, the electronic device can be triggered by the first camera to stop the continuous-shooting function of the second camera.

For example, after step 202, the shooting method provided in this embodiment of this application may further include the following step 202*c*.

Step 202*c*. When the target shooting object leaves the shooting range of the first camera, the shooting apparatus stops the continuous-shooting function of the second camera.

For example, the electronic device can detect, in real time via the first camera, whether a moving object is present in the shooting range of the first camera (including the shooting range of the second camera) and a movement direction of the object. Therefore, when detecting that the target shooting object leaves the shooting range of the first camera, the electronic device stops the continuous-shooting function of the second camera to avoid generation of multiple blank images (with no target shooting object).

In this way, when detecting that the target shooting object has left the shooting range of the first camera, the electronic device can stop the continuous-shooting function of the second camera, so as to reduce blank images.

According to the shooting method provided in this embodiment of this application, when the electronic device detects no target shooting object entering the shooting range of the first camera with a larger shooting range, the second camera with a smaller shooting range is in a working mode of the second recording frame rate (low-frame-rate mode), and when the electronic device detects a target shooting object having entered the shooting range of the first camera but having not entered the shooting range of the second camera, the recording frame rate of the second camera is updated from the second recording frame rate to the first recording frame rate (high-frame-rate mode) or the continuous-shooting function is started, so that the second camera works in the low-frame-rate recording mode before the target shooting object enters the shooting range of the second camera, and when the target shooting object has entered the shooting range of the second camera, the second camera can shoot the target shooting object in the high-frame-rate recording mode or take continuous shots of the target shooting object. This reduces power consumption of the second camera before slow-motion shooting or continuous shooting of the target shooting object and reduces file size of generated shot files.

It should be noted that the shooting method provided in the embodiments of this application may be performed by a shooting apparatus or a control module for performing the shooting method in the shooting apparatus. In the embodiments of this application, the shooting apparatus provided in the embodiments of this application is described by using the shooting method being performed by the shooting apparatus as an example.

It should be noted that, in the embodiments of this application, the shooting methods shown in the foregoing method drawings are all described with reference to an accompanying drawing in the embodiments of this application as an example. During implementation, the shooting methods shown in the foregoing method drawings may be alternatively implemented with reference to any other appropriate accompanying drawings in the foregoing embodiments. Details are not described herein.

Figure 4:
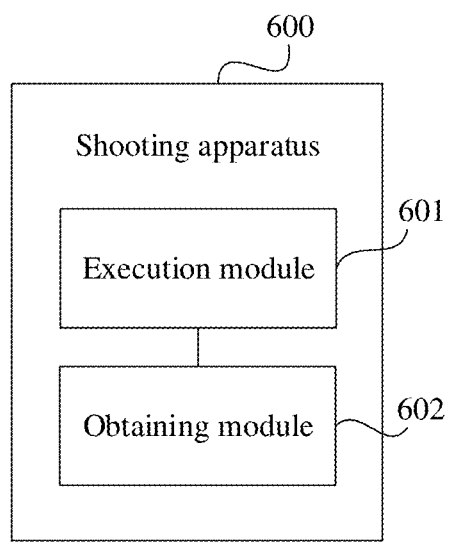
FIG. 4 is a schematic structural diagram of a shooting apparatus according to an embodiment of this application.

FIG. 4 is a schematic diagram of a possible structure of a shooting apparatus for implementing the embodiments of this application. As shown in FIG. 4, the shooting apparatus 600 includes an execution module 601 and an obtaining module 602. The execution module 601 is configured to: when a target shooting object has entered a shooting range of a first camera but has not entered a shooting range of a second camera, start a target shooting function of the second camera; and the obtaining module 602 is configured to: when the target shooting object has entered the shooting range of the second camera, obtain an image of the target shooting object captured by the second camera using the target shooting function started by the execution module 601; where the shooting range of the first camera is larger than the shooting range of the second camera, and the shooting range of the first camera includes the shooting range of the second camera; and the target shooting function includes a continuous-shooting function or a function of recording at a first recording frame rate.

Optionally, when the target shooting object has not entered the shooting range of the first camera, a recording frame rate of the second camera is a second recording frame rate; and the execution module 601 is configured to: when the target shooting object has entered the shooting range of the first camera but has not entered the shooting range of the second camera, update the recording frame rate of the second camera from the second recording frame rate to the first recording frame rate; where the second recording frame rate is less than the first recording frame rate.

Optionally, the execution module 601 is further configured to: when the target shooting object leaves the shooting range of the first camera or the shooting range of the second camera, update the recording frame rate of the second camera from the first recording frame rate to the second recording frame rate.

Optionally, the apparatus further includes an detection module 603, where the detection module 603 is configured to detect a shooting preview screen of the first camera, where the shooting preview screen includes a foreground area and a background area; the target shooting object is a shot object entering the foreground area at a speed exceeding a preset speed; and the preset speed is greater than a movement speed of any object in the background area.

Optionally, the execution module 601 is further configured to: when the target shooting object leaves the shooting range of the first camera, stop the continuous-shooting function of the second camera.

The shooting apparatus in this embodiment of this application may be an apparatus, or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network attached storage (NAS), a personal computer (PC), a television (TV), a teller machine, a self-service machine, or the like. This is not specifically limited in the embodiments of this application.

The shooting apparatus in this embodiment of this application may be an apparatus having an operating system. The operating system may be an Android operating system, may be an iOS operating system, or may be another possible operating system. This is not specifically limited in the embodiments of this application.

The shooting apparatus provided in this embodiment of this application is capable of implementing the processes implemented by the shooting apparatus in the method embodiments in FIG. 2 and FIG. 3. To avoid repetition, details are not described herein again.

For the shooting apparatus provided in this embodiment of this application, when an electronic device detects no target shooting object entering the shooting range of the first camera with a larger shooting range, the second camera with a smaller shooting range is in a working mode of the second recording frame rate (low-frame-rate mode), and when the electronic device detects a target shooting object having entered the shooting range of the first camera but having not entered the shooting range of the second camera, the recording frame rate of the second camera is updated from the second recording frame rate to the first recording frame rate (high-frame-rate mode) or the continuous-shooting function is started, so that the second camera works in the low-frame-rate recording mode before the target shooting object enters the shooting range of the second camera, and when the target shooting object has entered the shooting range of the second camera, the second camera can shoot the target shooting object in a high-frame-rate recording mode or take continuous shots of the target shooting object. This reduces power consumption of the second camera before slow-motion shooting or continuous shooting of the target shooting object and reduces file size of generated shot files.

Optionally, an embodiment of this application further provides an electronic device including a processor 110, a memory 109, and a program or instructions stored in the memory 109 and capable of running on the processor 110. When the program or instructions are executed by the processor 110, the processes of the foregoing shooting method embodiment are implemented, with the same technical effects achieved. To avoid repetition, details are not described herein again.

It should be noted that the electronic device in this embodiment of this application includes the aforementioned mobile electronic device and non-mobile electronic device.

Figure 5:
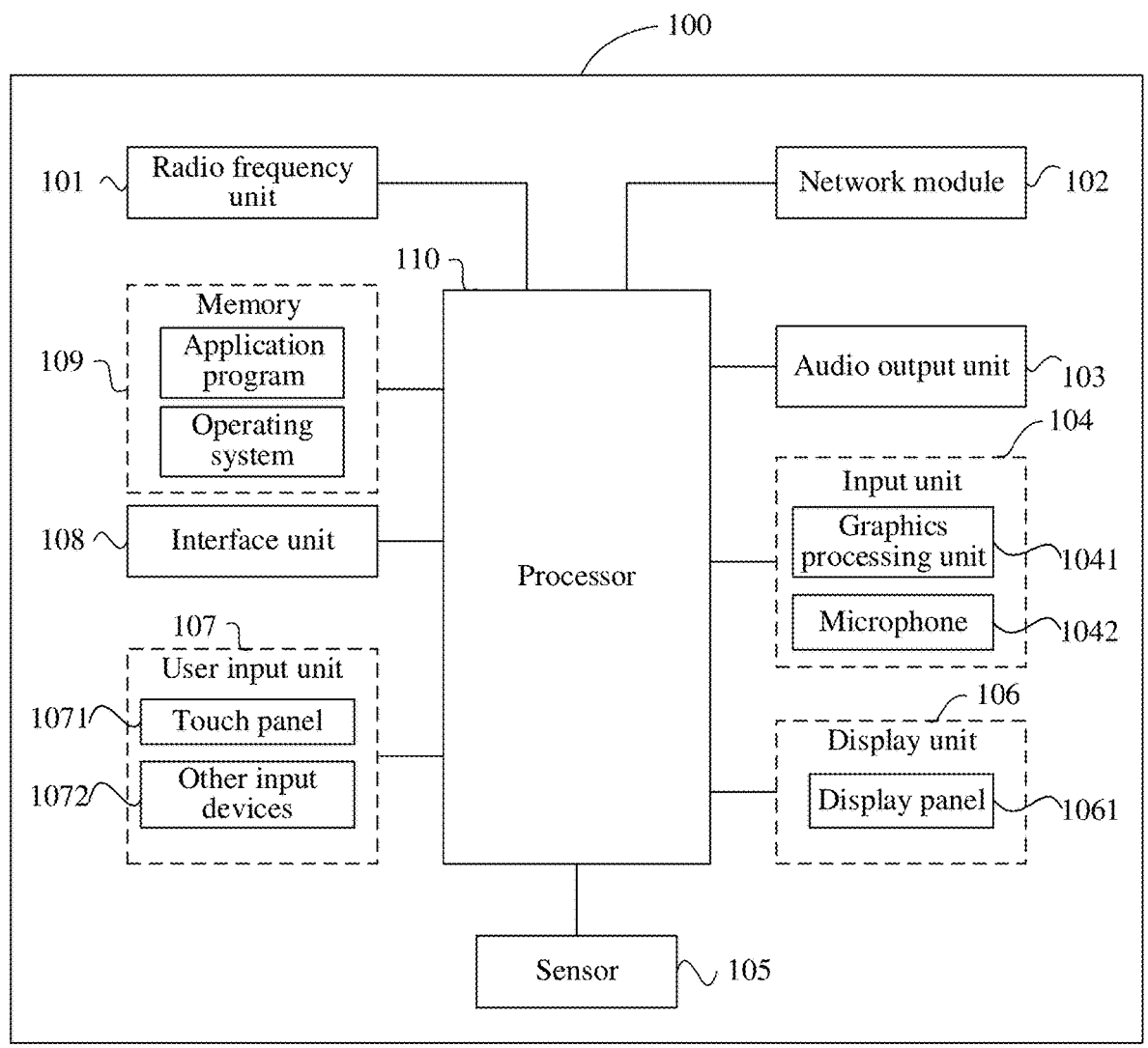
FIG. 5 is a schematic structural diagram of an electronic device according to an embodiment of this application.

FIG. 5 is a schematic diagram of a hardware structure of an electronic device for implementing the embodiments of this application.

The electronic device 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

Persons skilled in the art can understand that the electronic device 100 may further include a power supply (for example, a battery) that supplies power to the components. The power supply may be logically connected to the processor 110 through a power management system, so that functions such as charge management, discharge management, and power consumption management are implemented by using the power management system. The structure of the electronic device shown in FIG. 5 does not constitute a limitation on the electronic device. The terminal device may include more or fewer components than shown in the figure, or a combination of some components, or the components disposed differently. Details are not described herein.

The processor 110 is configured to: when a target shooting object has entered a shooting range of a first camera but has not entered a shooting range of a second camera, start a target shooting function of the second camera; and a camera in the sensor 105 is configured to: when the target shooting object has entered the shooting range of the second camera, obtain an image of the target shooting object captured by the second camera using the target shooting function started by the processor 110; where the shooting range of the first camera is larger than the shooting range of the second camera, and the shooting range of the first camera includes the shooting range of the second camera; and the target shooting function includes a continuous-shooting function or a function of recording at a first recording frame rate.

In this way, when it is detected that the target shooting object has entered the shooting range of the first camera but has not entered the shooting range of the second camera, a recording frame rate of the second camera is updated to the first recording frame rate (high-frame-rate mode) or a continuous-shooting function is started, so that the second camera works in a low-frame-rate recording mode before the target shooting object enters the shooting range of the second camera, and when the target shooting object has entered the shooting range of the second camera, the second camera can shoot the target shooting object in the high-frame-rate recording mode or take continuous shots of the target shooting object. This reduces power consumption of the second camera before slow-motion shooting or continuous shooting of the target shooting object and reduces file size of generated shot files.

Optionally, when the target shooting object has not entered the shooting range of the first camera, a recording frame rate of the second camera is a second recording frame rate; and the processor 110 is configured to: when the target shooting object has entered the shooting range of the first camera but has not entered the shooting range of the second camera, update the recording frame rate of the second camera from the second recording frame rate to the first recording frame rate; where the second recording frame rate is less than the first recording frame rate.

In this way, the electronic device can set the second camera to the high-frame-rate recording mode when the target shooting object has entered the shooting range of the first camera, so that when the target shooting object has entered the shooting range of the second camera, the second camera can shoot a complete slow-motion video of the target shooting object.

Optionally, the processor 110 is further configured to: when the target shooting object leaves the shooting range of the first camera or the shooting range of the second camera, update the recording frame rate of the second camera from the first recording frame rate to the second recording frame rate.

In this way, the electronic device can adjust the working mode of the camera when the target shooting object leaves the shooting range of the camera, so as to minimize the power consumption of the second camera and the size of shot files.

Optionally, the processor 110 is configured to detect a shooting preview screen of the first camera, where the shooting preview screen includes a foreground area and a background area; the target shooting object is a shot object entering the foreground area at a speed exceeding a preset speed; and the preset speed is greater than a movement speed of any object in the background area.

In this way, when an object entering the shooting range satisfies a specified condition, the electronic device can be triggered to adjust the recording frame rate of the second camera, so as to reduce false triggering.

Optionally, the processor 110 is further configured to: when the target shooting object leaves the shooting range of the first camera, stop the continuous-shooting function of the second camera.

In this way, when detecting that the target shooting object has left the shooting range of the first camera, the electronic device can stop the continuous-shooting function of the second camera, so as to reduce blank images.

When the electronic device provided in this embodiment of this application detects no target shooting object entering the shooting range of the first camera with a larger shooting range, the second camera with a smaller shooting range is in a working mode of the second recording frame rate (low-frame-rate mode), and when the electronic device detects a target shooting object having entered the shooting range of the first camera but having not entered the shooting range of the second camera, the recording frame rate of the second camera is updated from the second recording frame rate to the first recording frame rate (high-frame-rate mode) or the continuous-shooting function is started, so that the second camera works in the low-frame-rate recording mode before the target shooting object enters the shooting range of the second camera, and when the target shooting object has entered the shooting range of the second camera, the second camera can shoot the target shooting object in the high-frame-rate recording mode or take continuous shots of the target shooting object. This reduces power consumption of the second camera before slow-motion shooting or continuous shooting of the target shooting object and reduces file size of the generated shot files.

It should be understood that in this embodiment of this application, the input unit 104 may include a graphics processing unit 1041 and a microphone 1042. The graphics processing unit 1041 processes image data of a static picture or a video that is obtained by an image capture apparatus (for example, a camera) in a video capture mode or an image capture mode. The display unit 106 may include a display panel 1061, and the display panel 1061 may be configured in a form of a liquid crystal display, an organic light-emitting diode display, or the like. The user input unit 107 includes a touch panel 1071 and other input devices 1072. The touch panel 1071 is also referred to as a touchscreen. The touch panel 1071 may include two parts: a touch detection apparatus and a touch controller. The other input devices 1072 may include but are not limited to a physical keyboard, a function button (such as a volume control button or a power on/off button), a trackball, a mouse, and a joystick. Details are not described herein. The memory 109 may be configured to store software programs and various data which include but are not limited to an application program and an operating system. The processor 110 may integrate an application processor and a modem processor. The application processor mainly processes an operating system, a user interface, an application program, and the like. The modem processor mainly processes wireless communication. It can be understood that the modem processor may alternatively be not integrated in the processor 110.

An embodiment of this application further provides a non-transitory readable storage medium. The non-transitory readable storage medium stores a program or instructions. When the program or instructions are executed by a processor, the processes of the foregoing shooting method embodiment are implemented, with the same technical effects achieved. To avoid repetition, details are not described herein again.

The processor is the processor in the electronic device described in the foregoing embodiment. The non-transitory readable storage medium includes a non-transitory computer-readable storage medium such as a computer read-only memory (ROM), a random access memory (RAM), a magnetic disk, or an optical disc.

An embodiment of this application further provides a chip. The chip includes a processor and a communication interface. The communication interface is coupled to the processor. The processor is configured to run a program or instructions to implement the processes of the foregoing shooting method embodiment, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such process, method, article, or apparatus. In absence of more constraints, an element defined by "including a . . . " does not exclude another same element in the process, method, article, or apparatus that includes the element. In addition, it should be noted that the scopes of the method and apparatus in the implementations of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. Based on such an understanding, the technical solutions of this application essentially or the part contributing to the prior art may be implemented in a form of a software product. The software product may be stored in a storage medium (for example, a ROM/RAM, a magnetic disk, or a compact disc), and includes several instructions for instructing an electronic device (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A shooting method, wherein the method comprises:
   when a target shooting object has entered a shooting range of a first camera but has not entered a shooting range of a second camera, starting a target shooting function of the second camera; and
   when the target shooting object has entered the shooting range of the second camera, obtaining an image of the target shooting object captured by the second camera using the target shooting function; wherein
   the shooting range of the first camera is larger than the shooting range of the second camera, and the shooting range of the first camera includes the shooting range of the second camera; and the target shooting function comprises a continuous-shooting function or a function of recording at a first recording frame rate;
   wherein, when the target shooting object has not entered the shooting range of the first camera, a recording frame rate of the second camera is a second recording frame rate; and
   when a target shooting object has entered a shooting range of a first camera but has not entered a shooting range of a second camera, starting a target shooting function of the second camera comprises:
   when the target shooting object has entered the shooting range of the first camera but has not entered the shooting range of the second camera, updating the recording frame rate of the second camera from the second recording frame rate to the first recording frame rate; wherein
   the second recording frame rate is less than the first recording frame rate.

2. The method according to claim 1, wherein after the obtaining an image of the target shooting object captured by the second camera, the method further comprises:
   when the target shooting object leaves the shooting range of the first camera or the shooting range of the second camera, updating the recording frame rate of the second camera from the first recording frame rate to the second recording frame rate.

3. The method according to claim 1, wherein before the starting a target shooting function of the second camera, the method further comprises:
   detecting a shooting preview screen of the first camera, wherein
   the shooting preview screen comprises a foreground area and a background area; the target shooting object is a shot object entering the foreground area at a speed exceeding a preset speed; and the preset speed is greater than a movement speed of any object in the background area.

4. The method according to claim 1, wherein after the obtaining an image of the target shooting object captured by the second camera using the target shooting function, the method further comprises:
   when the target shooting object leaves the shooting range of the first camera, stopping the continuous-shooting function of the second camera.

5. A chip, wherein the chip comprises a processor and a communication interface, the communication interface is coupled to the processor, and the processor is configured to run a program or instructions to implement the shooting method according to claim 1.

6. An electronic device, including a processor, a memory, and a program or instructions stored in the memory and executable on the processor, wherein the program or instructions, when executed by the processor, cause the electronic device to perform:
   when a target shooting object has entered a shooting range of a first camera but has not entered a shooting range of a second camera, starting a target shooting function of the second camera; and
   when the target shooting object has entered the shooting range of the second camera, obtaining an image of the target shooting object captured by the second camera using the target shooting function; wherein the shooting range of the first camera is larger than the shooting range of the second camera, and the shooting range of the first camera includes the shooting range of the second camera; and the target shooting function comprises a continuous-shooting function or a function of recording at a first recording frame rate;

wherein, when the target shooting object has not entered the shooting range of the first camera, a recording frame rate of the second camera is a second recording frame rate; and the program or instructions, when executed by the processor, cause the electronic device to perform:

when the target shooting object has entered the shooting range of the first camera but has not entered the shooting range of the second camera, updating the recording frame rate of the second camera from the second recording frame rate to the first recording frame rate; wherein the second recording frame rate is less than the first recording frame rate.

7. The electronic device according to claim 6, wherein the program or instructions, when executed by the processor, cause the electronic device to further perform:

when the target shooting object leaves the shooting range of the first camera or the shooting range of the second camera, updating the recording frame rate of the second camera from the first recording frame rate to the second recording frame rate.

8. The electronic device according to claim 6, wherein the program or instructions, when executed by the processor, cause the electronic device to further perform:

detecting a shooting preview screen of the first camera, wherein the shooting preview screen comprises a foreground area and a background area; the target shooting object is a shot object entering the foreground area at a speed exceeding a preset speed; and the preset speed is greater than a movement speed of any object in the background area.

9. The electronic device according to claim 6, wherein the program or instructions, when executed by the processor, cause the electronic device to further perform:

when the target shooting object leaves the shooting range of the first camera, stopping the continuous-shooting function of the second camera.

10. A non-transitory readable storage medium, wherein the non-transitory readable storage medium stores a program or instructions, and the program or instructions, when executed by a processor in an electronic device, cause the electronic device to perform:

when a target shooting object has entered a shooting range of a first camera but has not entered a shooting range of a second camera, starting a target shooting function of the second camera; and when the target shooting object has entered the shooting range of the second camera, obtaining an image of the target shooting object captured by the second camera using the target shooting function; wherein the shooting range of the first camera is larger than the shooting range of the second camera, and the shooting range of the first camera includes the shooting range of the second camera; and the target shooting function comprises a continuous-shooting function or a function of recording at a first recording frame rate;

wherein, when the target shooting object has not entered the shooting range of the first camera, a recording frame rate of the second camera is a second recording frame rate; and the program or instructions, when executed by the processor, cause the electronic device to perform:

when the target shooting object has entered the shooting range of the first camera but has not entered the shooting range of the second camera, updating the recording frame rate of the second camera from the second recording frame rate to the first recording frame rate; wherein the second recording frame rate is less than the first recording frame rate.

11. The non-transitory readable storage medium according to claim 10, wherein the program or instructions, when executed by the processor, cause the electronic device to further perform:

when the target shooting object leaves the shooting range of the first camera or the shooting range of the second camera, updating the recording frame rate of the second camera from the first recording frame rate to the second recording frame rate.

12. The non-transitory readable storage medium according to claim 10, wherein the program or instructions, when executed by the processor, cause the electronic device to further perform:

detecting a shooting preview screen of the first camera, wherein the shooting preview screen comprises a foreground area and a background area; the target shooting object is a shot object entering the foreground area at a speed exceeding a preset speed; and the preset speed is greater than a movement speed of any object in the background area.

13. The non-transitory readable storage medium according to claim 10, wherein the program or instructions, when executed by the processor, cause the electronic device to further perform:

when the target shooting object leaves the shooting range of the first camera, stopping the continuous-shooting function of the second camera.

\* \* \* \* \*